Aug. 15, 1961   G. P. BOSOMWORTH ET AL   2,996,110
APPARATUS FOR TRIMMING PROJECTIONS FROM TIRES
Filed March 12, 1959   3 Sheets-Sheet 3

United States Patent Office 2,996,110
Patented Aug. 15, 1961

2,996,110
APPARATUS FOR TRIMMING PROJECTIONS FROM TIRES
George P. Bosomworth, Akron, and Wilhelm Brey, Cuyahoga Falls, Ohio, assignors to The Firestone Tire & Rubber Company, Akron, Ohio, a corporation of Ohio
Filed Mar. 12, 1959, Ser. No. 798,990
3 Claims. (Cl. 157—13)

This invention relates to means for trimming tires and more particularly, for trimming projections which are formed on pneumatic tires while they are being molded.

Tire molds are commonly provided with small vent holes extending from the mold cavity to the atmosphere to permit the escape of air and other gases which, if trapped within the mold cavity, would prevent the complete filling of the cavity with the tire molding stock. During the tire molding operation, the softened rubber stock flows into these vent holes and later cures to form on the surface of the finished product unsightly projections which are called pin vents. Especially in larger tires, the pin vents are great in number and are distributed over a wide area of the tire surface. Many tires have been placed on the market with the pin vents still in place because their removal with heretofore-available equipment has been a difficult and time-consuming procedure.

Some common disadvantages of prior-art devices for trimming pin vents are excessive expensive, difficulty of maintenance, and unsatisfactory performance characteristics. Specific disadvantages of the known trimming devices have included slow operation, such severance of the pin vents that either long, unsightly stubs or crack-inducing depressions remain on the tire surface, non-uniform trimming on wide and irregularly shaped tire surfaces such as sidewalls, and cutting and scuffing the tire surface during the trimming operation.

To overcome the disadvantages of prior-art devices, it is a primary object of this invention to provide an economical, easily maintained means for quickly removing pin vents from tires without damaging the tire surface.

It is another object of this invention to provide an apparatus for removing pin vents from an irregularly shaped tire surface without cutting or scuffing the surface.

It is another object of this invention to provide an automatic apparatus for trimming pin vents from tires which is more effective and requires less maintenance than other presently known automatic trimmers.

It is a further object of this invention to provide means embodying looped, flexible trimming wires which so remove pin vents that neither unsightly stubs nor crack-inducing dimples are left on the tire surfaces.

It is a particular object of this invention to provide apparatus embodying flexible trimming wires which are so shaped and positioned that adjacent wires may coact to remove pin vents.

The invention broadly provides means for trimming projections from the surface of a rubbery article whereby a plurality of bellied-out loops of flexible wire are adapted to move at high speed successively against the pin vents to sever them from the rubber surface.

The preferred embodiment of the invention will now be described in detail with reference to the accompanying drawings in which.

Figure 1:
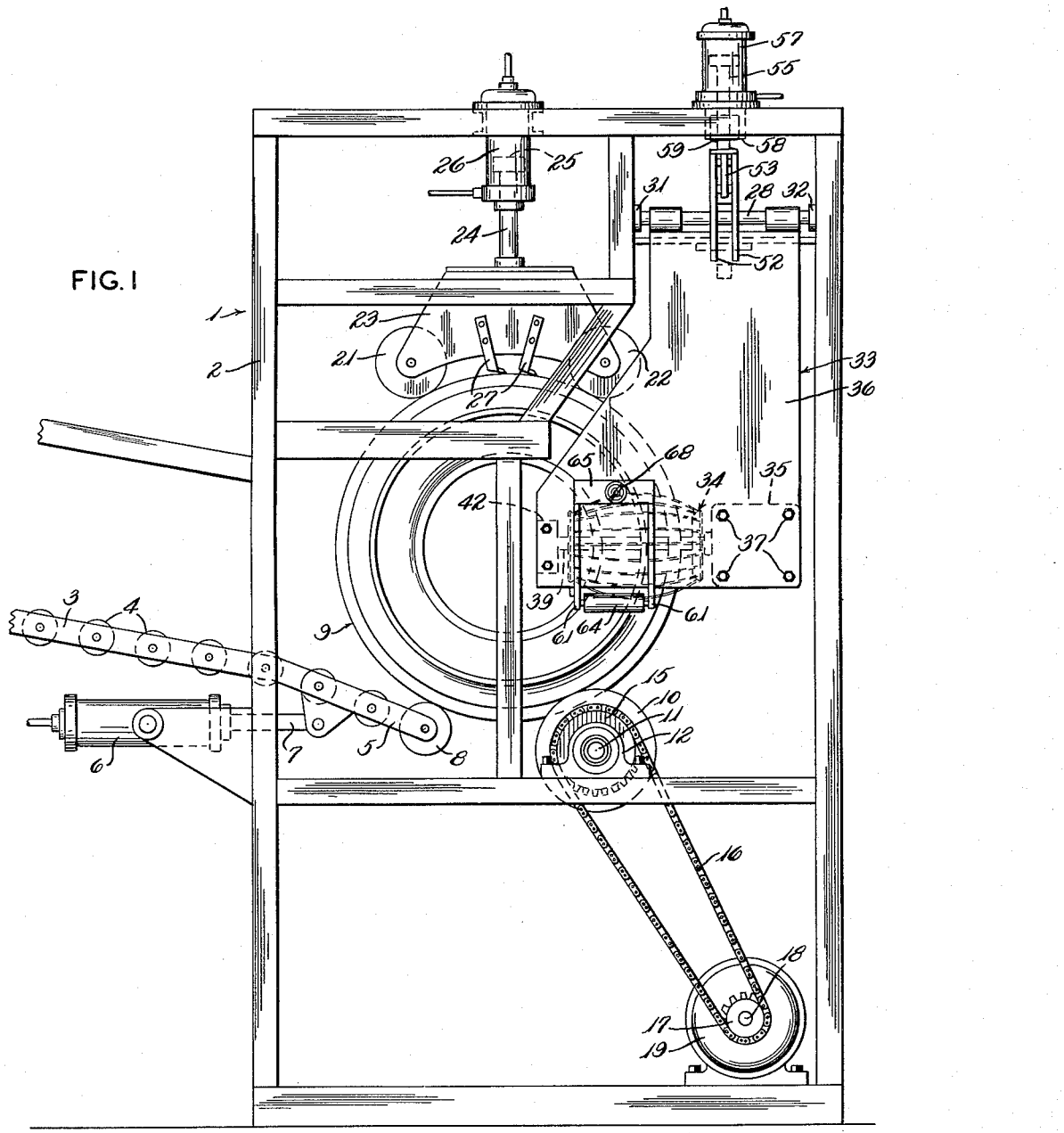
FIG. 1 is a side elevational view of an apparatus according to the invention.
Figure 2:
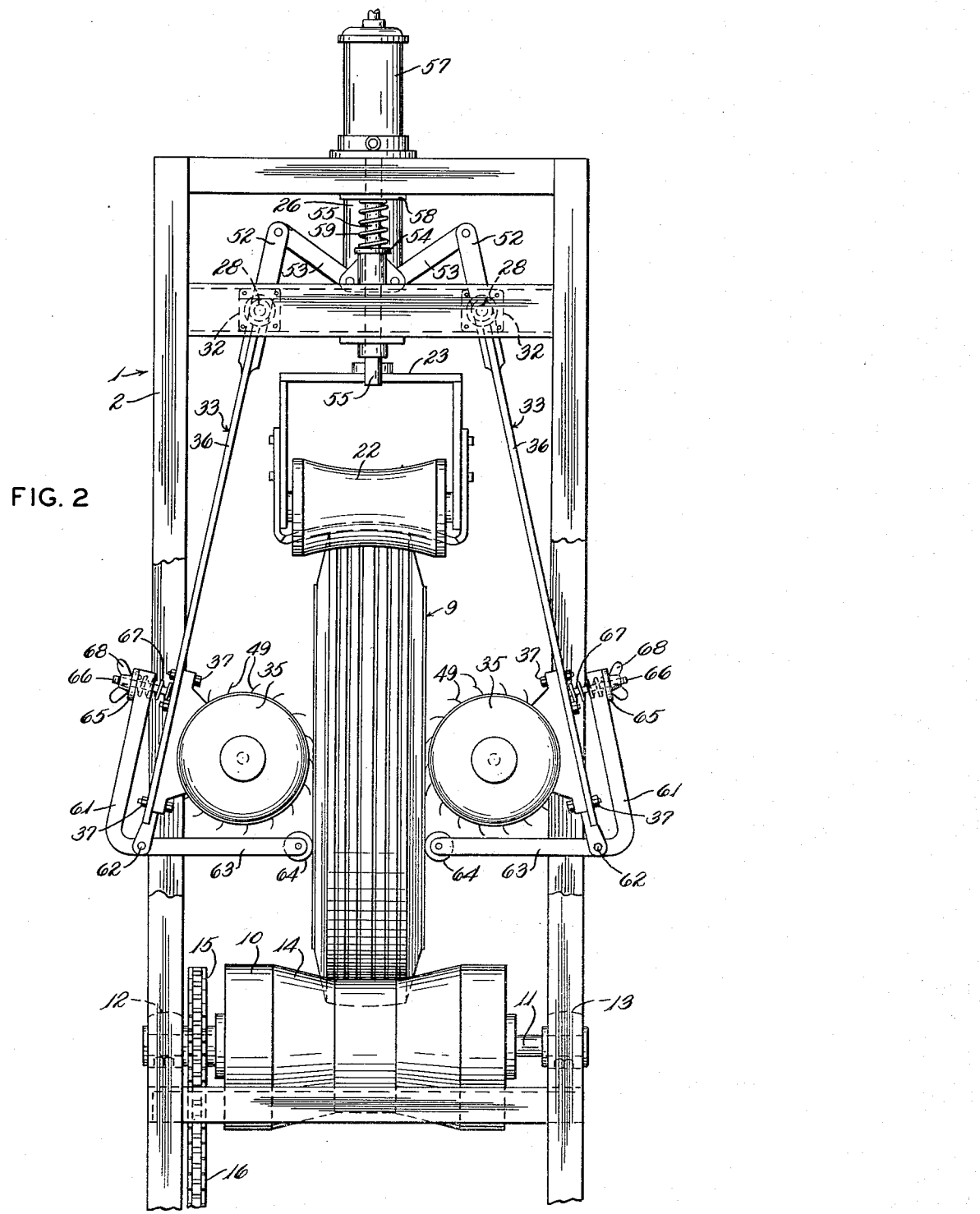
FIG. 2 is a partly broken away front elevational view of the apparatus shown in FIG. 1.
Figure 3:
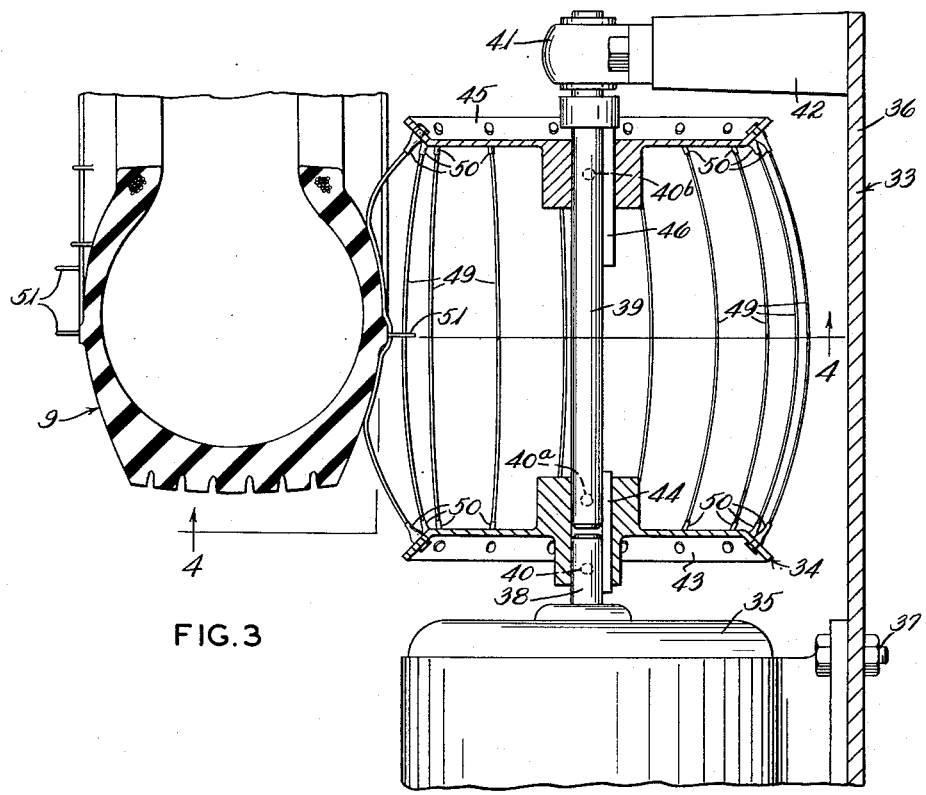
FIG. 3 is an enlarged fragmentary sectional view showing one of the trimming cages according to the invention in operative position against a tire.
Figure 6:
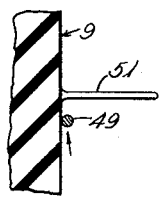
FIGS. 6, 7, 8, 9, 10 are views illustrating in time sequence the manner in which a projection is removed by a trimming wire in accordance with the invention.
Figure 7:
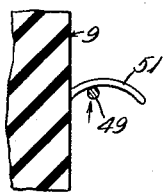
Figure 8:
Figure 9:
Figure 10:

With reference to FIGS. 1 and 2, there is illustrated a tire-trimming apparatus designated generally by the reference numeral 1. The apparatus includes a frame 2 which consists of a plurality of supporting and bracing members suitably connected together as by welding and shown and described only to the extent necessary for a complete understanding of the invention.

Connected to one side of the frame 2 is a tire conveyor 3 having a series of rollers 4 for transporting a tire from a source of supply (not shown) to the trimming apparatus 1. The conveyor 3 is provided with a pivoted terminal section 5 which extends inside the frame 2 and may be adjustably positioned by a fluid-pressure cylinder 6 which is mounted on frame 2 by any suitable connection. The cylinder 6 operates a piston rod 7 which is pivotally connected to the conveyor terminal section 5. An enlarged guide roller 8 is provided at the end of the conveyor section 5.

When a tire 9 is received from the conveyor into the trimming apparatus, it is supported between the guide roller 8 and a driving roller 10 which is mounted on shaft 11 which in turn is journalled in bearings 12 and 13 in frame 2. The driving roller 10 is provided with a concave surface 14 upon which the tire 9 rests. Mounted on the drive roller shaft 11 at one end of the drive roller 10 is a sprocket 15 which is driven by a chain 16 which in turn is driven by sprocket 17 mounted on drive shaft 18 of a suitable motor 19 which is preferably electric. The motor 19 is connected to the frame 2 in any suitable manner as by bolting. Rotation may be imparted to the tire 9 by the motor 19 through the medium of drive roller 10.

The tire 9 which rests upon the rollers 8 and 10 is additionally supported and stabilized on its upper surface by a pair of guide rollers 21 and 22 which are pivotally connected between the opposing legs of a reciprocable U-shaped bracket 23. The bracket 23 may be reciprocated vertically by means of piston rod 24 which is connected to a piston 25 operated by fluid-pressure cylinder 26. The cylinder 26 is mounted by any suitable connection on the frame 2. A pair of generally U-shaped knives 27 are riveted or otherwise connected to the bracket 23 between the guide rollers 21 and 22. The knives 27 are so positioned vertically as to rest against or very close to the tread portion of the tire 9 when the guide rollers 21 and 22 are lowered into contact with such tread portion. The knives 27 sever the pin vents 51 from the tread portion of the tire when the latter is rotated.

A pair of horizontally spaced shafts 28 are each journaled in a pair of bearings 31 and 32 carried by structural members in the upper portion of frame 2. Hanging from each of the shafts 28 is a trimming assembly 33 which includes a carrier plate 36 rigidly connected to the shaft 28, a motor 35 which is preferably electric and is bolted to the lower portion of the carrier plate 36 by bolts 37, and a rotatably mounted trimming cage 34 operated by motor 35.

Trimming cage 34 is provided with an axially extending shaft 39, one end of which extends outwardly from cage 34 and is journaled in a suitable bearing assembly 41 which is mounted on a bracket 42 which in turn is fixed as by welding to carrier plate 36. The other end of the shaft 39 is fixed to flanged end plate 43 to which is also fixed the drive shaft 38 of motor 35. End plate 43 is retained against sliding movement relative to each of the shafts 38 and 39 by suitable set screws 40 and 40a and is held against rotation by key 44. A second flanged end plate 45 is secured to shaft 39 by a key 46 and a set screw 40b at a position spaced from end plate 43. Extending between end plates 43 and 45, slack trimming wires 49 are held substantially parallel to shaft 39 by the resilient, snap-in anchors 50 bonded to the ends of the wires and inserted in the circumferentially spaced holes 50a in the flanges of the end plates.

Welded to the top of each carrier plate 36 is a pair of lever arms 52, the upper ends of which are pivotally connected to a link 53. The opposite ends of the links 53 are pivotally connected to a collar 54 which is rigidly connected to a piston rod 55 which is operated by a fluid-pressure cylinder 57 which in turn is mounted by any suitable connection on the top of frame 2. Connected between the upper surface of collar 54 and the lower surface of a bearing plate 58 secured as by welding to frame 2 is a coil spring 59 which resists upward movement of the collar 54 and piston rod 55. The link 53 and lever 52 form a toggle linkage which pivots the carrier plate 36 about the axis of shaft 28 to move the cage 34 inwardly when the collar 54 is moved upwardly. Conversely, the cage 34 is moved outwardly when the collar 54 is moved downwardly. By this arrangement, the cages 34 may be positively urged against the opposite sidewalls of the tire 9. Alternatively, the cages could be urged against the tire sidewalls by other means such as by gravity or by hand. Moreover, other forms of linkage may be utilized in bringing the cages 34 into contact with the tire.

At the lower end of each carrier plate 36, there is pivotally connected by pin 62 a pair of spaced bell crank levers 61. The inner arms 63 of the levers 61 extend inwardly below the cage 34 and connected between such arms is a guide roller 64 which bears against the tire sidewall. Connected between the opposite ends of the levers 61 is a bridge plate 65 which is drilled to slidably receive a bolt 66 fixed to and extending outwardly from carrier plate 36. A coil spring 67 is mounted between bridge plate 65 and carrier plate 36 to resist inward movement of the bridge plate. A wing nut 68 on the end of the bolt 66 permits adjustment of the bell crank 61 and thus the guide roller 64. The guide roller 64 may function as a stop to limit the inward movement of the cage 34 against the tire 9.

When cage 34 is rotated at high speed and urged into a trimming position against the irregular surface of a tire sidewall, the slack wires belly out to form loops which conform to the sidewall surface by flexing inwardly as they brush against it. Hugging the surface as they wipe across it, the whirling loops impinge against the protruding pin vents 51. Usually the impinging loops merely knock the pin vents aside, but frequently an individual loop entwines with one, carries it along, and stretches it until it is severed.

Figure 4:
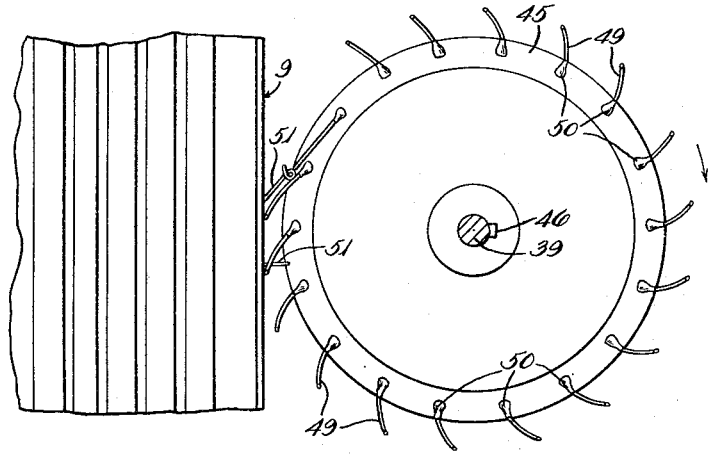
FIG. 4 is a view taken along line 4—4 of FIG. 3.
Figure 5:
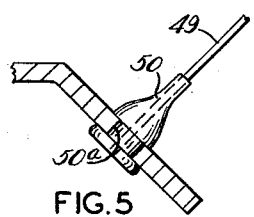
FIG. 5 is a fragmentary sectional view of the end of one of the trimming wires of the invention.

How the loops sever the pin vents is not known definitely because the severance occurs so fast that the eye cannot follow the action. However, it is believed that the severance is effected by the coaction of adjacent loops, as is illustrated in FIG. 4 and in time sequence in FIGS. 6 to 10, inclusive. One loop engages a pin vent and stretches it while the next loop severs it by wiping across its base.

Many factors as, for example, the speed of rotation and the length and spacing of the wires affect the rate at which the pin vents are removed. The following data comprise a typical set of operating conditions under which the invention can be practiced effectively by means of the preferred embodiment hereinbefore described:

Type of wire—0.011" dia., 7 strand, steel wire cable
Number of wires—18
Length of a wire—10¾ inches
Axial distance between the fixed ends of a wire—10 inches
Distance between a fixed end of a wire and the axis of rotation—4½ inches
Distance between the tire and the axis of rotation—5 inches
Rate of rotation of the cage—1750 r.p.m.

In operation of the trimming apparatus 1, a tire 9 having pin vents formed thereon is transported down the conveyor 3 and comes to rest between the guide roller 8 and the drive roller 10. Fluid-pressure cylinder 26 is actuated to move piston 25 downwardly, thus positioning the guide rollers 21 and 22 against the upper tread portion of the tire 9. The motor 19 rotates the guide roller 10 which imparts rotary motion to the tire 9. During such rotation, the knives 27 sever the pin vents which are formed on the tread portion of the tire. Motors 35 impart rotation to the cages 34 after which the fluid-pressure cylinder 57 is actuated to move the collar 54 upwardly against the resistance of spring 59 to positively urge the cages 34 inwardly against the sidewalls of the tire. As the tire 9 is rotated past the rotating cages 34, the wires 49 separate the pin vents from the sidewalls as shown in FIGS. 6–10 inclusive. Usually all of the pin vents are removed in a single rotation of the tire 9. However, if any pin vents remain, the operation is continued until they are all removed.

The cylinder 57 is then actuated to move the collar 54 downwardly, thus moving the cages 34 outwardly away from the tire 9. The cylinder 26 is then actuated to raise the guide rollers 21 and 22 to permit removal of the trimmed tire 9.

The apparatus of the invention is adaptable for automatic operation in a tire finishing conveyor. For example, a tire rolling down conveyor 3 can be made to trip a conventional switch which energizes motor 19. The fluid-pressure cylinders may be actuated in timed relation by means of conventional cycle timers energizing and deenergizing solenoid valves in the respective pressure supply and exhaust lines of the cylinders.

It has been found that a trimming apparatus embodying a cage constructed in accordance with the invention quickly and cleanly removes pin vents over a wide and irregularly-shaped tire surface leaving no unsightly, long stubs or dimples. Further, the wires do not scuff or cut the tire sidewall in the pin-vent trimming operation. The apparatus is relatively inexpensive and easy to operate. Further, it is apparent that the present invention presents a tire-trimming machine which is readily adaptable to completely automatic operation. This machine, so adapted, is not only more effective than automatic trimmers heretofore known but also requires less maintenance. It is obvious, however, that a trimming device embodying the cages 34 may be non-automatic.

While the invention has been described for use in trimming pin vents from tires, it will be understood that it may be used with equal effectiveness in removing similar projections from various other articles formed from rubber or other plastic material.

There has been illustrated and described what is considered to be a preferred embodiment of the invention. It will be understood, however, that various modifications may be made by persons skilled in the art without departing from the scope of the invention as set forth in the appended claims.

What is claimed is:

1. Trimming apparatus, comprising a frame, a carrier on said frame adapted for motion relative the surface of an article to be trimmed, a trimming cage on said carrier and moveable therewith into contact with said surface, means on said carrier to impart high-speed rotation to said cage, and means to move said carrier with respect to said article, said cage comprising spaced, fixed end plates having annular flange portions extending at an angle to the axis of said cage, a plurality of substantially inextensible, flexible trimming elements extending between said plates, each said trimming element having end portions each mounted in resilent means in a respective flange portion, for limited resilient longitudinal movement generally normal to said flange portion, whereby when said cage is rotated to belly-out said trimming elements into contact with said surface, the impact of said trimming elements with projections on said surface will be absorbed by said resilient means.

2. Trimming apparatus as in claim 1, wherein said means to move said carrier comprises fluid pressure drive means, link means connecting said fluid pressure means and said carrier, and pivot means on said frame supporting said carrier.

3. Trimming apparatus as in claim 1, and lever means on said carrier for engagement with said surface of said article to limit the movement of said carrier with respect to said article.

References Cited in the file of this patent

UNITED STATES PATENTS

| | | |
|---|---|---|
| 1,983,684 | Strong | Dec. 11, 1934 |
| 2,035,802 | George | Mar. 31, 1936 |
| 2,225,472 | Franklin | Dec. 17, 1940 |
| 2,603,290 | Lindemann | July 15, 1952 |
| 2,815,073 | Wikle et al. | Dec. 3, 1957 |
| 2,847,845 | Frank et al. | Aug. 19, 1958 |

FOREIGN PATENTS

| | | |
|---|---|---|
| 700,399 | Great Britain | Dec. 2, 1953 |